United States Patent [19]

Fogg, III

[11] 4,210,694
[45] Jul. 1, 1980

[54] LAMINATED COMPOSITE STRUCTURAL FITTING AND METHOD OF MAKING

[75] Inventor: Lawrence D. Fogg, III, Burbank, Calif.

[73] Assignee: Lockheed Corporation, Burbank, Calif.

[21] Appl. No.: 795,286

[22] Filed: May 9, 1977

[51] Int. Cl.² .................. B32B 3/00; B32B 27/04; B32B 27/12
[52] U.S. Cl. ................. 428/174; 156/217; 156/227; 264/258; 428/121; 428/192; 428/245; 428/246; 428/298; 428/413; 428/902
[58] Field of Search ............... 428/80, 121, 122, 175, 428/192, 367, 245, 246, 408, 413, 902, 298, 542; 264/257, 258; 248/342, DIG. 9; 93/49 R, 84 R; 229/14 C, DIG. 4, 16 R, 16 A, 37 R; 156/217, 227

[56] References Cited
U.S. PATENT DOCUMENTS

| | | | |
|---|---|---|---|
| 2,485,235 | 10/1949 | Graf | 229/DIG. 4 |
| 2,808,766 | 10/1957 | Larsen | 93/49 R |
| 2,953,292 | 9/1960 | McCall | 229/16 A |
| 3,050,229 | 8/1962 | Neff | 229/16 R |
| 3,589,971 | 6/1971 | Reed | 428/80 |
| 3,684,636 | 8/1972 | Rothrock, Jr. et al. | 428/80 |
| 3,973,720 | 8/1976 | Schmid | 428/542 |
| 3,995,081 | 11/1976 | Fant et al. | 428/130 |

Primary Examiner—P. Thibodeau
Attorney, Agent, or Firm—Lowell G. Turner

[57] ABSTRACT

Laminated composite structural fitting is a joint fitting for transfer of mechanical loads from one member to another. The fitting has a bottom and an end, each for attachment to adjacent members and one or more sides to serve as a structural joining gusset. A flat sheet of composite material is shaped to form one bottom, one or more sides and two or more end pieces and is folded so as to form a laminated structure comprised of a plurality of interleaved layers arranged so that portions of the end pieces overlap at the corners between the ends and the sides of the composite structure to provide a multilayer, strong corner.

7 Claims, 11 Drawing Figures

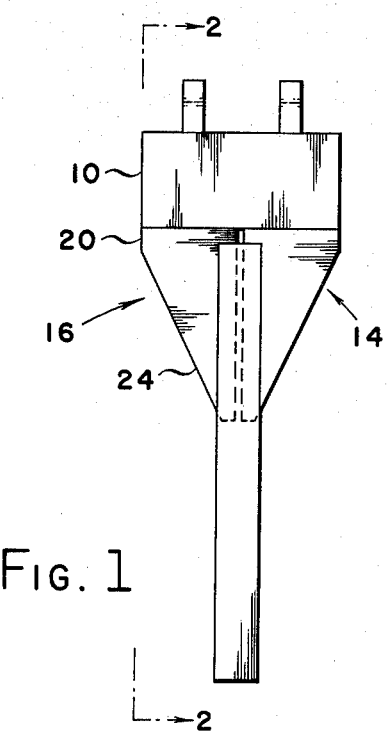
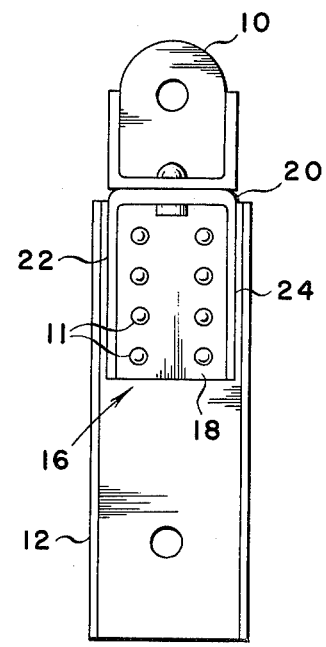
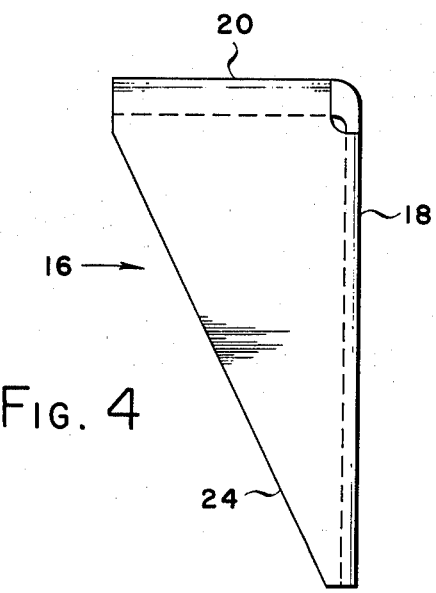
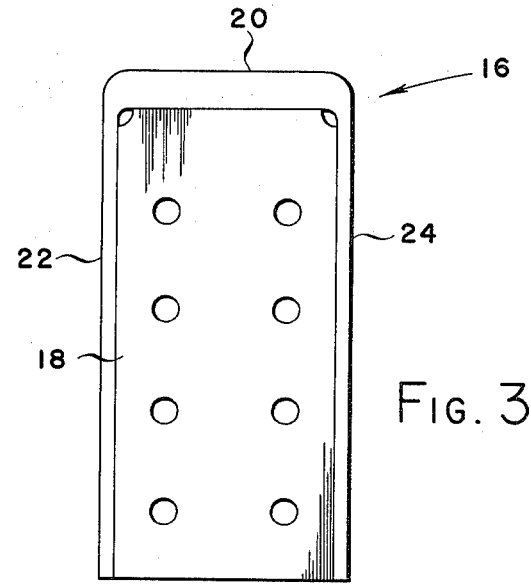
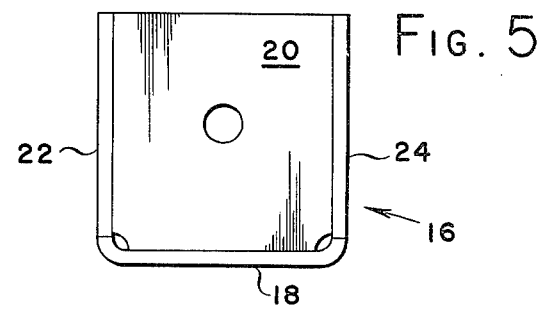

LAMINATED COMPOSITE STRUCTURAL FITTING AND METHOD OF MAKING

BACKGROUND

This invention is directed to a laminated composite structural fitting and method for making the fitting, comprised of forming a plurality of one or more layers each successively folded to overlap at the end and at the corners to provide maximum corner strength.

In aircraft construction there are a number of locations in which loads must be transferred from one structural member to another. A typical illustration of a critical area in aileron construction is the transfer of loads from the aileron actuator fittings to the front spar, the rib, and to the aileron surfaces. Ribs are provided at each hinge and at each actuator station to share in carrying this load and to redistribute it onto the surface panels. The fitting which inter-engages between the hinge and actuator structure and the rib is an important structure for the transfer of the load.

The prior art fittings and methods of construction of such fittings comprises the machining, casting or forging metals to the desired geometry. After that, composite fittings were created, but these have been formed by high pressure compression molding of chopped fiber and thermosetting resin in matched precision steel dies. The fibers are often fiber-glass, graphite, or Boron fibers and are chopped at appropriate lengths for molding in a particular mold structure. Furthermore, in such structures a formed oriented glass, graphite, or Boron surface inlay is often used to define the outer stress surfaces. However, since the fibers are chopped they are randomly organized, and not organized in a direction for optimum material characteristics. Other multi-layer structures have not employed interleaving which interlaces or interleaves panels around a corner for stress distribution around the corner for an optimum structural composite fitting.

Aircraft need structure with maximum strength and minimum weight with load carrying fittings of this nature serving essential load transfer needs and contributing minimum weight to the aircraft structure.

SUMMARY

In order to aid in the understanding of this invention it can be stated in essentially summary form that it is directed to a laminated composite structural fitting which has a bottom, an end and a side, with the fitting formed of a plurality of filamentary reinforced composite layers, each interengaging, with panels from one side interleaving with those from the other side at the end, to uniformly build up the corner between the sides and the end.

The method comprises the cutting of a plurality of layers, and successively laying them up with successive interleaving of end panels on the end of the part, followed by curing the assembled structure.

It is thus the object of this invention to provide a laminated composite structural fitting, together with a method of making it so that such a fitting has adequate strength to transfer the necessary loads with a minimum of weight.

Another object is to provide a composite structural fitting which is capable of being secured between two or more members to transfer mechanical loads between the members, with a maximum strength to weight ratio.

It is a further object to provide a composite structural fitting of laminated construction which is of suitable character to meet the critical mechanical load requirements found in aircraft structures.

Still a further object is to employ the advantageous characteristics of filamentary reinforced composite structural sheet material for the production of a composite structural fitting of three dimensional shape and laminated construction which is capable of maximum performance.

It is yet another object of this invention to provide a low cost means of fabricating light weight structurally efficient tension or compression type fittings of three dimensional geometry with laminated filamentary or woven composite materials.

A still other object is to provide joints between panels of such fittings having structural continuity at corners for transmitting flexural and shear loads.

Additional objects and advantages of this invention will become apparent from the study of the following portion of this specification, the claims and the attached drawings.

BRIEF DESCRIPTION OF THE DRAWINGS

FIG. 1 is a top plan view of the juncture between a rib and a hinge, showing two typical laminated composite structural fittings in accordance with a first embodiment of this invention, the fittings interconnecting the load between the rib and hinge;

FIG. 2 is a side elevational view of the arrangement of FIG. 1, taken along line 2—2 of FIG. 1;

FIG. 3 is a top plan view of one of the laminated composite structural fittings of FIG. 1;

FIG. 4 is a side elevational view of the fitting of FIG. 3;

FIG. 5 is an end elevational view of the fitting of FIG. 3;

DESCRIPTION OF THE PREFERRED EMBODIMENT

Figure 6:
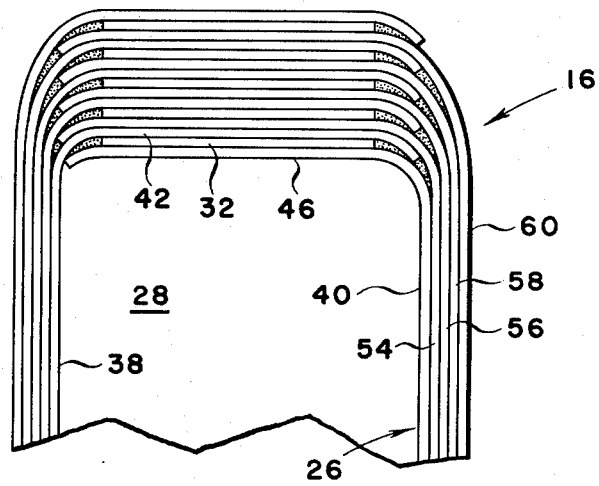
FIG. 6 is an enlarged view of the two corners between the side panels and end panels, as seen in FIG. 3.

FIGS. 1 and 2 illustrate one typical application with hinge member 10 adjacent rib member 12, and these members are joined together and structurally attached by means of composite structural fittings 14 and 16.

These fittings provide low-cost, light-weight structurally efficient fittings of three dimensional geometry for joining the two members for the transfer of loads therebetween. As seen in FIGS. 3, 4, and 5, fitting 16 which is identical to fitting 14, has a bottom 18, an end 20 and two sides 22 and 24.

As shown in FIGS. 1 and 2, bottom 18 is for attachment to the web of rib member 12, and end 20 is for attachment to the back of the bottom plate of hinge member 10. Sides 22 and 24 form structural joining gussets and fit between the flanges of the rib member. Attachment is by means of through fittings, e.g., bolts or rivets 11, FIG. 2, so that the loads are transferred. Sides 22 and/or 24 can also be attached to structure such as surfaces (not shown) to aid in the load transfer.

Figure 7:
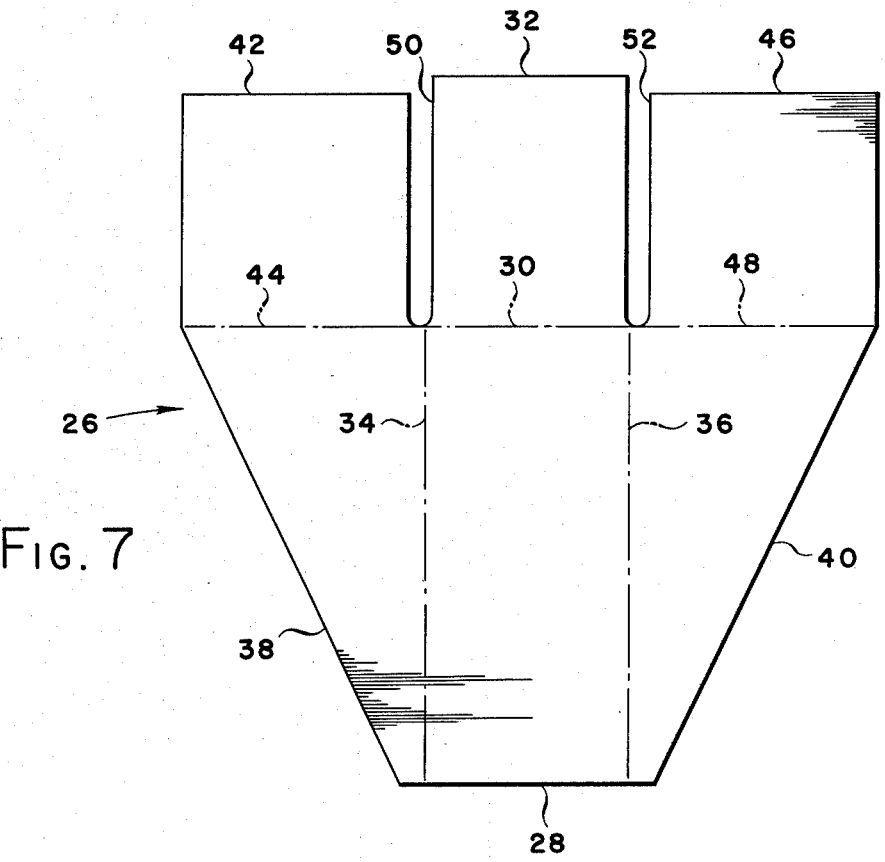
FIG. 7 is a plan view of a cut layer of preimpregnated composite sheet material in flat form prior to being folded up into and interleaved in the lay up of the composite structural fitting of FIG. 3.

Piece 26 shown in FIGS. 6 and 7 is one piece of the lay up which is folding into and molded into fitting 16. Piece 26 is formed of graphite unidirectional tape or cloth layers preimpregnated with epoxy. Since the fitting may be formed of one or more layers, layers with different characteristics can be applied. Filamentary or woven materials are preferred. A material such as that commercially known as T300/5208 graphite epoxy preimpregnated tape, for example, is usable. Each piece 26 serves as a ply in the finished structure. The orientation of the filaments in each of the plies is chosen so that the fibers are oriented in each layer to obtain maximum fitting efficiency. Ply 26 can be formed of multiple layers, for example, with some of the layers oriented at zero degrees, and with others oriented at plus or minus 45 degrees (or, some other orientation, depending on the structural requirements). With these layers laid together, the ply is cut out as shown in FIG. 7. A subassembly of such layers forms a piece or ply, which, for example may be of a configuration as that illustrated in FIG. 7. In this configuration it has a bottom panel 28 which is connected to fold lines 34 and 36 to side panels 38 and 40, respectively. An end panel 42 adjoins side panel 38 along fold line 44 while an end panel 46 adjoins side panel 40 along fold line 48. A notch 50 separates end panels 32 and 42 while a second notch 52 separates end panels 32 and 46, the panel 32 adjoining the panel 28 at fold line 30.

When the first ply 26 is cut to size and shape, it is laid over a male mold member which has an external configuration corresponding to that of the inside of the finished piece, illustrated in FIGS. 3, 4, and 5. The male mold member, in a preferred arrangement, is made of silicone rubber and coated with a Teflon freecote parting agent release system. As ply 26 is laid on, bottom 28 is engaged on the counterpart bottom of the male mold member and sides 38 and 40 are folded down along the counterpart sides of the mold member along fold lines 34 and 36. The male mold member has a suitable radius corner such as ⅛″ radius in order to provide suitable curved corners with minimum stress concentration. When the bottoms and sides are laid against the male mold member then the end panels are interleaved. As is seen in FIG. 6, first end panel 46 is folded around fold line 48 around the end of the male mold member. Next, end panel 32 is folded up and finally end panel 42 is folded around fold line 44. The dimensions of the end panels are such that they are fully overlapped and fully interleaved, with end panels 42 and 46 being longer than the width of end panel 32 so that the ends of the end panels 42 and 46 engage past the end panel 32 and partially fill up the corner to provide a smooth fully formed transition from the end to the sides.

Ply after ply is laid up one after the other over the male mold until all plies are laid, in the embodiment shown, five plies. As seen in FIG. 6, plies 26, 54, 56, 58 and 60 are successively laid up, each with the end panels overlapping. As previously stated, ply 26 is formed of one or more layers, organized with the first layer, the one toward the male mold, as being oriented at zero degrees. The second layer is also oriented at zero degrees and the next two layers are oriented at plus 45 degrees. In ply 54 the inside two layers are oriented at minus 45 degrees and the outside layers are oriented at zero degrees. In ply 56, all four layers are oriented at zero degrees. In ply 58, the inside two layers are oriented at zero degrees while the outside two layers are oriented at minus 45 degrees. Finally, in the outside ply 60 the inside two layers are oriented at 45 degrees and outside two layers are oriented at zero degrees. It is to be noted that the ply orientation sequence described above is for purposes of illustration, as any orientation sequence can be employed as required to accomplish the structural objectives. Further, the number of layers in a ply can be one or more depending on manufacturing requirements. Each of the plies is cut out and folded from its subassembly of individual layers and folded into the shape of the fitting, as previously has been stated.

After layup of the graphite epoxy layers on the male mold is completed, armalon Teflon release cloth is applied followed by Mochburg bleeder paper in the ratio of one ply of Mochburg for each four layers of graphite epoxy. This assembly consisting of a male mold, graphite epoxy layers, armalon, and Mochburg paper is enclosed in a nylon vacuum bag, evacuated, placed in an oven, heated to 200° F. for 15 minutes under vacuum, removed from the oven, and cooled to room temperature. Subsequently the vacuum bag, Mochburg paper, and armalon are removed and the male mold and prebled graphite epoxy laminate are inserted into a steel female mold with the configuration of the outside of the finished piece, illustrated in FIGS. 3, 4, and 5. The female mold is coated with a Teflon freecote parting agent release system.

Thereupon the assembly including the male and female mold parts and the prebled laminate are cured. As the first step the assembly is positioned in a heated platen press, and the assembly is heated to 275° F. at a heating rate of 5 to 10 degrees Fahrenheit per minute. When the curing assembly is heated to 275° F., it is held at this temperature for 30 minutes without pressure. Subsequently, a pressure of 85 psi is applied, and the temperature increased to 360° F. at a heating rate of 5 to 10 degrees Fahrenheit per minute. The assembly is held at 360° F. for 120 minutes and then cooled to 140° F. before pressure is released. The effect of the curing cycle is to cause the epoxy in the individual layers to initially flow together forming a homogeneous matrix and thereafter harden, while the filamentary material remains in proper orientation. Thereafter, the laminated composite structural fitting is removed from the press. It is then ready for trimming and drilling of the necessary attachment holes so that it may be attached to the members to which it will transmit load.

Figure 8:
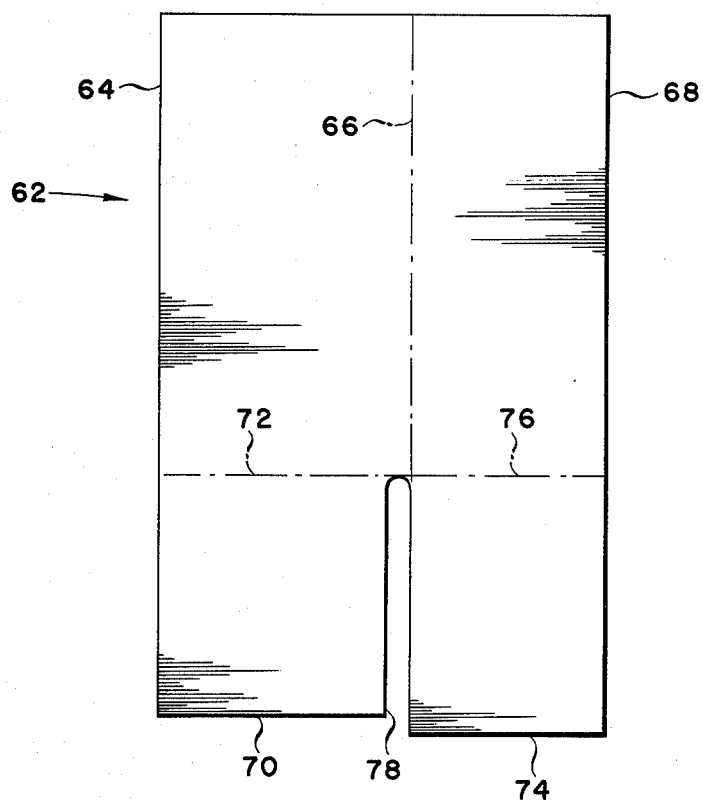
FIG. 8 is a plan view of a cut layer of preimpregnated composite sheet material in accordance with a second embodiment of this invention, illustrating the cut layer prior to being folded up, interleaved and molded into a composite structural angle fitting.
Figure 9:
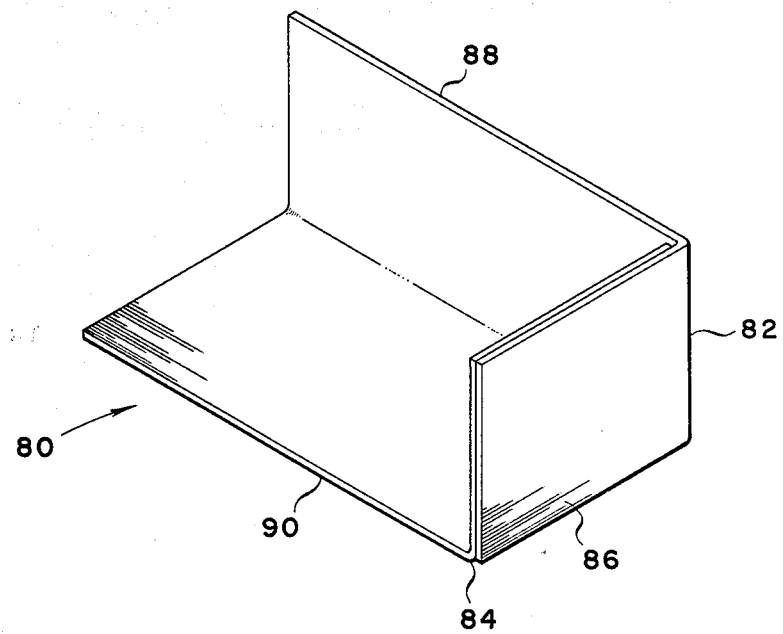
FIG. 9 is an isometric view of an assembled laminated composite structural angle fitting following folding, interleaving and molding of the cut layer seen in FIG. 8, or a plurality of such layers.

The second embodiment seen in FIGS. 8 and 9 is similar to the embodiment shown in FIG. 7 with the exception that instead of the three-sided piece 26, i.e., the bottom panel and two adjoining side panels, each provided with their respective end panels, a piece 62 of two-sided configuration is shown. In this configuration, the piece 62 has a bottom panel 64 which is connected at fold line 66 to a side panel 68. An end panel 70 adjoins the bottom panel 64 along a fold line 72 and an end panel 74 adjoins side panel 68 along fold line 76. A notch 78 separates end panels 70 and 74. As in the aforementioned embodiment of FIG. 7, piece 62 is one piece of the lay up which is folded and molded into an angle fitting 80. Likewise, piece 62 serves as a ply in the finished structure and, typically, is formed of graphite unidirectional tape or cloth layers preimpregnated with epoxy and, similarly, may be formed of one or more layers of different structural characteristics. Also, as in the previous embodiment, filamentary or woven materials are preferred; the orientation in each one of the plies is chosen such that the fibers are oriented in each layer in a direction to obtain maximum fitting efficiency.

When the first ply 62 is cut to size and shape, it is laid over a male mold which has an external configuration corresponding to that of the inside of the finished piece illustrated in FIG. 9. As ply 62 is laid on, bottom 64 is engaged on the counterpart bottom of the male mold member and side 68 is folded down along the counterpart side of the mold along fold line 66. The male mold member, again, has a suitable radius corner such as ⅛" radius in order to provide suitable curved corners with minimum stress concentration. When the bottom and side panels 64, and 68, respectively, are laid against the male mold member then the end panels 70 and 74 are interleaved. In the present embodiment, first end panel 74 is folded around fold line 76 around the end of the male mold member. Next, end panel 70 is folded up around fold line 72. Again, the dimensions of the end panels 70, 74 are such that they are fully overlapped and interleaved, with end panel 70 being longer than the width of end panel 74, these dimensions providing that the corners 82, 84, FIG. 9, are adequately filled up to provide a smooth fully formed transition from the end 86 to the side 88 and bottom 90. Upon lay-up of the ply or plies and after each of the plies has been cut out and folded from its subassembly of individual layers and folded into the shape of the fitting, the embodiment shown in FIGS. 8 and 9 is, subsequently, subjected to the same curing and molding process, as has been previously discussed with respect to the arrangement of FIGS. 6 and 7.

The third embodiment of the invention seen in FIGS. 10 and 11, again, is similar to the embodiment of FIG. 7, except that in the present instance a four-sided tubular fitting 92 of generally rectangular configuration is shown. In this arrangement, a piece 94 is shown having a bottom panel 96 which is connected at fold lines 98, 100, to side panels 102, 104, respectively. Side panel 104, in turn, is connected at fold line 106 to a third side panel 108, the latter panel being connected to a tab member 110 via a fold line 112. End panels 114, 116, 118 and 120 adjoin the bottom panel 96, and the side panels 102, 104 and 108, respectively, along fold lines 122, 124, 126 and 128, respectively. Notches 130, 132, and 134, respectively, separate the end panels 114, 116, 118 and 120 from one another.

The piece 94 is formed and constituted in similar manner as described hereinbefore with respect to the arrangements of the layers, plies or pieces of FIGS. 6, 7, 8 and 9. It should be noted, however, that the cut out of piece 94 differs in that, in the present instance four panels in addition to a connecting tab are provided as opposed to the three-panel structure of FIGS. 6 and 7, and the two-panel structure of FIGS. 8 and 9.

Figure 11:
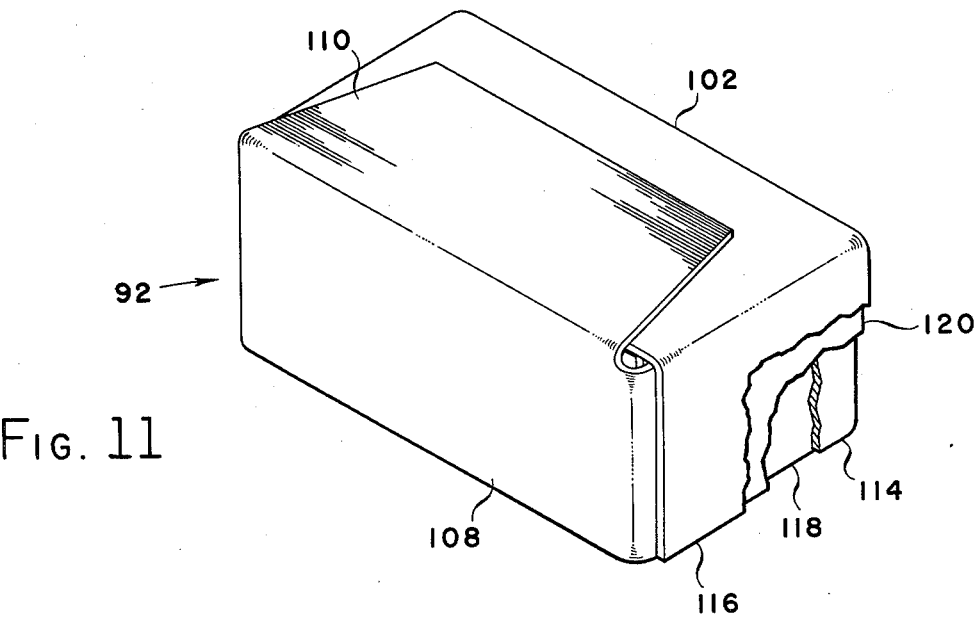
FIG. 11 is an isometric view of an assembled laminated composite tubular fitting following folding, interleaving and molding of the cut layer seen in FIG. 10, or a plurality of such layers.

When the first ply 94 is cut to size and shape, it is laid over a male mold member which has an external configuration generally in the shape of a rectangle and corresponding to that of the inside of the finished piece illustrated in FIG. 11. As ply 94 is laid on, bottom 96 is engaged on the counterpart bottom of the male mold member while side panels 102 and 104 are folded down along the counterpart sides of the mold along fold lines 98 and 100. The male mold member, again, has a suitable radius corner such as a ⅛" radius in order to provide suitable curved corners with minimum stress concentration. When the bottom and side panels 96, 102, 104, respectively, are laid against the male mold member then the side panel 108 is superimposed onto the counterpart side of the mold along fold line 106, this latter panel being located directly opposite bottom panel 96. Finally, the tab member 110 is folded along fold line 112 and attached to side panel 102.

When the bottom and sides are laid against the male mold member then the end panels are interleaved. First end panel 118 is folded around fold line 126 around the end of the mold. Next end panel 114 is folded around fold line 122 and superimposed onto end panel 118. Subsequently, end panel 120 is folded up around fold line 128 and which, in turn, is superimposed onto panel 114. Finally, end panel 116 is folded around fold line 124 and superimposed onto panel 120.

As the next piece is laid on, the bottom 96 is engaged with the previous side panel 108 and the folding is accomplished as described above such that the tab member 110 is on the opposite side from the previous tab member 110. By alternating the location of bottom 96 the thickness buildup due to tab member 110 is distributed equally on opposite sides of the tube.

Figure 10:
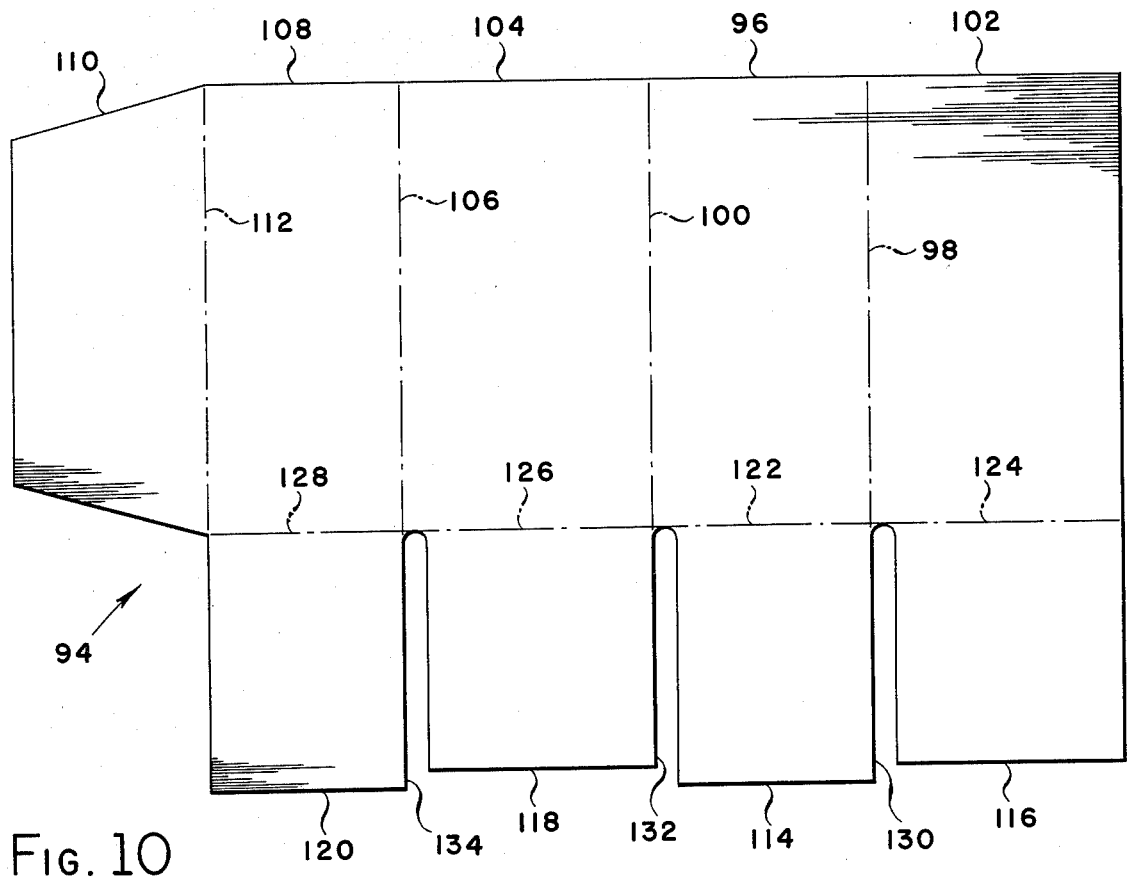
FIG. 10 is a plan view of a cut layer of preimpregnated composite sheet material in accordance with a third embodiment of this invention, illustrating the cut layer prior to being folded up, interleaved and molded into a composite structural tubular fitting.

Again, the dimensions of the end panels are such that they are fully overlapped and interleaved, with panels 114 and 120 being longer than the width of end panels 116 and 118 so that the ends of the panels 114 and 120 engage past the panels 116 and 118 and partially fill up the corners to provide a smooth fully formed transition from the end to the sides. The embodiment shown in FIGS. 10 and 11 is, subsequently, subjected to the same curing and molding process, as has been previously discussed with respect to the arrangement of FIGS. 6 and 7.

This invention having been described in this preferred embodiment, it is clear that it is susceptible to numerous modifications and embodiments within the ability of those skilled in the art and without the exercise of the inventive faculty. Accordingly, the scope of this invention is defined by the scope of the following claims.

I claim:

1. A laminated composite structural fitting comprising: a ply of high strength, oriented, reinforcing filamentary or woven material in the nature of graphite, boron or glass and impregnated with a thermosetting resin, said ply having a bottom, at least one side integrally formed with said bottom and separated therefrom by a fold line, an end panel integrally formed with said bottom and separated therefrom by a fold line, an end panel integrally formed with said at least one side and separated therefrom by a fold line, said side being folded to an angle with respect to said bottom along fold line and said end panels being folded with respect to said bottom and said side at said fold lines, said end panels being in overlapped condition and laminated to each other to form a homogeneous filamentary reinforced multiple thickness end panel, one of said end panels being dimensioned so that it extends at least part way around the fitting corner defined by one of said fold lines so that multiple thickness is achieved by overlap through at least part of the corner.

2. The composite structural fitting of claim 1, wherein there are first and second sides, both integrally formed with said bottom and separated therefrom by respective first and second fold lines, each of said first and second sides having an end panel integrally formed therewith and separated therefrom by a fold line, each of said end panels being configured so that when the three dimensional fitting is formed by folding said ply on its fold lines, said end panels overlap and extend at least partly around one of said corners defined by said fold lines to strengthen the corner for distributing stress around the corner from said end panel through said side to said bottom.

3. The composite structural fitting of claim 2, wherein there are a plurality of plies, each having at least two end panels, a side panel and a bottom panel and each superimposed on the other, said plies each having overlapping end panels for improved stress distribution around said fitting.

4. A laminated composite structural fitting comprising: a ply of high strength oriented reinforcing filamentary or woven material in the nature of graphite, boron or glass and impregnated with a thermosetting resin, said ply having a bottom and first, second and third sides, said sides being integrally formed with each other and with said bottom and being separated from each other and said bottom by fold lines, an end panel integrally formed with said bottom and separated therefrom by a fold line, an end panel integrally formed with each of said sides and separated therefrom by fold lines, said sides being folded relative to said bottom along said fold lines to form a fitting of tubular configuration and said end panels being folded with respect to said bottom and said sides at said fold lines, said end panels extending in overlapped condition and laminated to each other to provide a homogeneous filament reinforced multiple thickness end panel for said fitting, a tab member extending from the outermost one of said sides and separated therefrom by a fold line and operable, in assembled condition of the ply, to be laminated to the opposite outermost end of said sides.

5. A laminated composite structural fitting comprising: a ply of oriented, high strength, filament-reinforced, thermosetting resin-impregnated material, said filament being in the nature of graphite, boron or glass, said ply having a bottom panel and a side panel adjacent to and integrally formed with said bottom panel and separated therefrom by a fold line, and first and second end panels respectively adjacent to said bottom panel and said side panel and separated therefrom by fold lines, said fitting having said end panels overlapping and laminated to each other to form a homogeneous filament reinforced corner for stress distribution around the corner from said end panel through said side panel to said bottom panel.

6. A laminated composite structural fitting comprising: a ply of unidirectionally oriented, high strength, reinforcing filamentary or woven material in the nature of graphite, boron or glass, said ply having a bottom panel, first and second side panels adjacent to said bottom panel and separated therefrom by a fold line, and first and second and third end panels respectively adjacent to said first and second sides and said bottom panel and separated therefrom by fold lines, said fitting having said end panels overlapping and laminated to each other to form a homogeneous end panel for stress distribution, said fitting retaining said oriented filaments in position in a body of materials selected from the group consisting of cured thermosetting and thermoplastic polymeric materials.

7. The fitting of claim 6, wherein there are a plurality of said plies having said panels, each of said plies being laid up on each other with overlapping end panels so that corners formed by folding between said panels having a plurality of overlapping panel layers at least through a portion of said corners, each of said plies being filaments impregnated with a polymer and cured.

* * * * *